Oct. 23, 1962  D. A. MINTZ  3,059,610
APPARATUS FOR APPLYING BEADS OF PLASTIC MATERIAL
ONTO SHEET MATERIAL

Filed Dec. 11, 1959  2 Sheets-Sheet 1

INVENTOR.
DAVID A. MINTZ
BY Krazinski & Nolan
ATTORNEYS

Oct. 23, 1962  D. A. MINTZ  3,059,610
APPARATUS FOR APPLYING BEADS OF PLASTIC MATERIAL
ONTO SHEET MATERIAL
Filed Dec. 11, 1959  2 Sheets-Sheet 2

INVENTOR.
DAVID A. MINTZ
BY
*Kraszinski + Nolan*
ATTORNEYS

United States Patent Office 3,059,610
Patented Oct. 23, 1962

3,059,610
APPARATUS FOR APPLYING BEADS OF PLASTIC MATERIAL ONTO SHEET MATERIAL
David A. Mintz, 12 Evergreen Terrace, Millburn, N.J.
Filed Dec. 11, 1959, Ser. No. 858,922
5 Claims. (Cl. 118—7)

The present invention relates to ornamentation, and more particularly to apparatus for applying bead-like particles onto sheet material arranged in a decorative pattern.

In the manufacture of many kinds of wearing apparel and the like, there is a demand for fabric having bead-like formations applied thereto in a decorative pattern. To do this by hand is a time consuming and costly procedure. While some machines have been proposed for applying such beads, none has been found to be satisfactory.

Accordingly, an object of the present invention is to provide improved apparatus for applying beads or the like onto sheet material, such as fabric, plates, paper, leather and the like.

Another object is to provide such apparatus which is simple and economical in construction and is practical and reliable in operation.

Another object is to provide such apparatus which will apply beads on a large sheet in a prearranged pattern in a very rapid manner.

A further object is to provide such a machine which can be operated automatically.

Other and further objects will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawing, forming a part of the specification, wherein.

Figure 1:
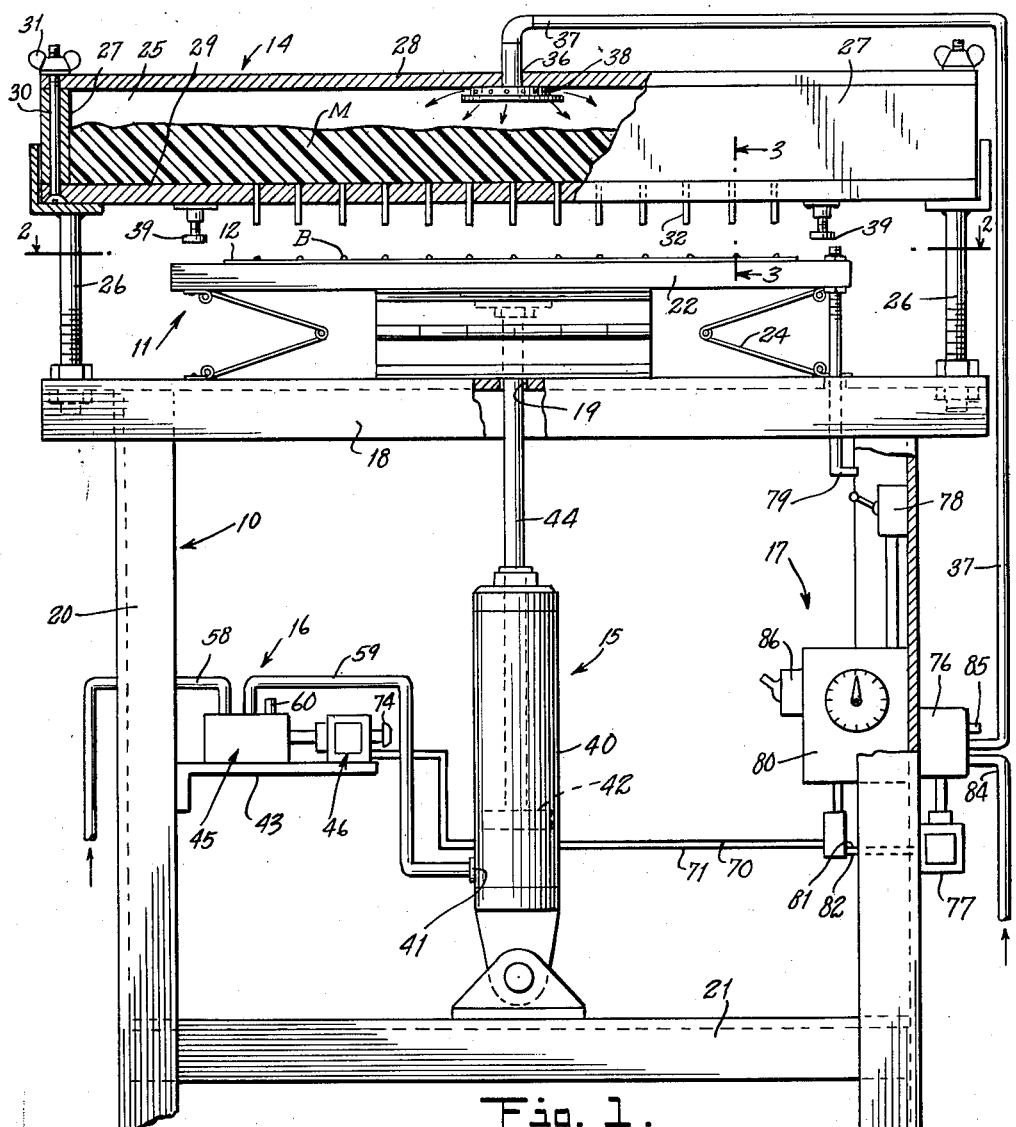
FIG. 1 is an elevational view, partly in section, of apparatus in accordance with the present invention.

Referring to the drawings in detail, there is shown apparatus which generally comprises a frame 10, means 11 for supporting a sheet of material 12 onto which beads B are to be applied, means 14 for extruding the beads, a fluid operated motor 15 for moving the supporting means towards and away from the extruding means, control means 16 for the motor, and control means 17 for the extruding means.

Figure 2:
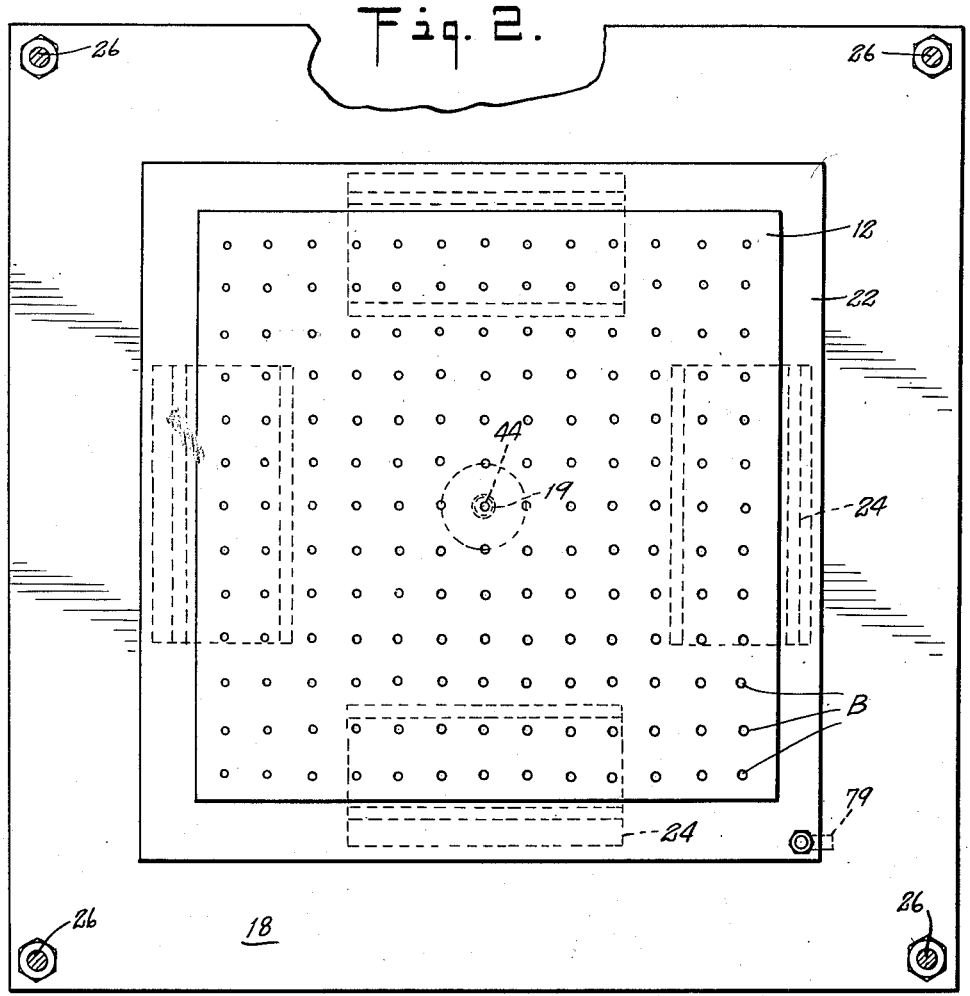
FIG. 2 is a sectional view taken along the line 2—2 on FIG. 1.

The frame 10 comprises a top 18 having an opening 19 (FIG. 2), upright members 20 on which the top is mounted, and a suitable number of horizontal members 21 for bracing the upright members and providing support for the fluid motor 15.

The sheet supporting means 11 comprise a platform 22 on which the sheet is placed and a plurality of hinges 24 for movably mounting the platform on the top 18 of the frame.

Figure 3:
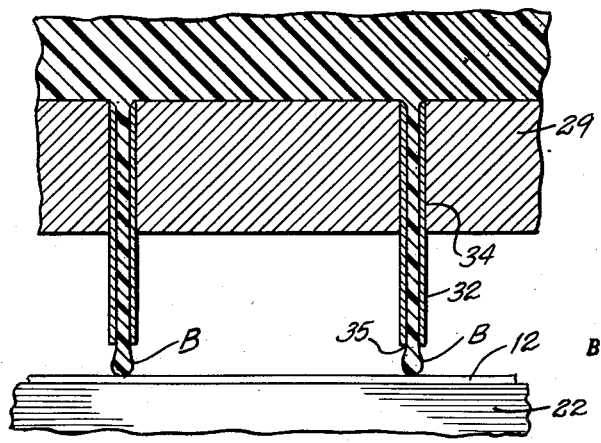
FIG. 3 is an enlarged fragmentary sectional view taken along the line 3—3 on FIG. 1.

The extruding means 14 comprises a closed container or tank 25 for the material M to be extruded and upright members 26 for mounting the tank on the top 18 of the frame. The tank is in the form of a shallow box having side walls 27, a top wall 28 and a bottom wall 29 which are removably secured for the purpose explained hereinafter by bolts 30 and wing nuts 31. The bottom wall 29 is formed with outlet means, such as tubes 32 inserted into apertures 34 and having an opening 35 facing the sheet 12 (FIG. 3). The top wall 28 has an inlet 36 for a conduit 37 adapted to supply air under pressure to a distributing head 38 at the underside of the top wall to cause the material to be extruded through the tubes 32.

Adjustable stops 39 are mounted on the underside of the bottom wall 29 for limiting the upward movement of the platform 22 and for positioning the sheet 12 adjacent the tube openings 35 to receive the beads B.

While the bead extruding tubes 32 are shown arranged in lengthwise and crosswise extending rows, it is contemplated that they could be arranged in a more ornate and elaborate pattern. Also it is contemplated that the beads in the pattern could have different colors. This could be accomplished by using as many machines as there are colors and applying the beads in stages to complete the design. Also, by reason of the removability of the bottom wall 29, a set of bottom wall members with different bead extruding arrangements can be used with each machine.

The extruded material is of a plastic consistency and is adapted to be extruded by a pressure of about seventy p.s.i. in the air space above the material in the tank. A suitable material for this purpose may be a mixture comprising:

35 lbs. liquid resin
14 lbs. powdered clay
350 cc. powdered borate
175 cc. ammonium chloride The fluid motor 15 comprises a cylinder 40 having an inlet 41 adjacent its lower end and mounted on the brace member 21 in upright position, a piston 42 in the cylinder, and a rod 44 interconnecting the piston and the platform 22.

The control means 16 for the fluid motor 15 is supported on a bracket 43 and comprises a two-way valve 45 for alternately connecting the cylinder to a source of air under pressure and to the atmosphere, and a solenoid 46 for holding the valve in a position to admit air to the cylinder and raise and maintain the platform in its upper position.

Figure 4:
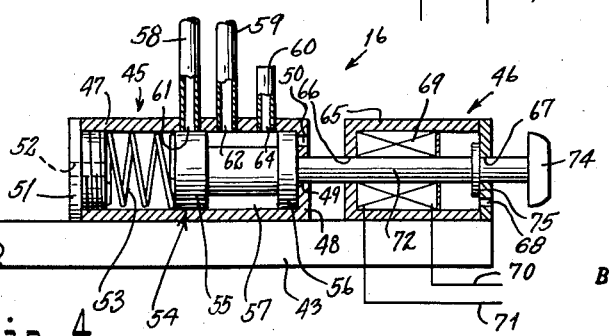
FIG. 4 is a longitudinal sectional view of a control valve.

Such a control arrangement is shown in FIG. 4 wherein the valve 45 comprises a cylindrical casing 47 having a wall 48 at one end formed with a central aperture 49 and a vent 50, a plug 51 formed with a vent 52 screw threaded into the other end of the casing, a valve member 54 slidably mounted in the casing and having cylindrical surfaces 55 and 56 spaced apart by an annular recess 57, a return spring 53 biased between the plug 51 and the valve member 54, and three conduits 58, 59 and 60 connected to the casing to provide three spaced ports 61, 62 and 64 cooperating with the valve member 54.

As shown herein, the conduit 58 is connected to a source of compressed air, the conduit 59 is connected to the inlet 41 at the lower end of the cylinder 40 of the motor 15, and the conduit 60 is vented to the atmosphere. When the valve member 54 is in its non-operating position, as shown, the ports 62 and 64 are connected by the recess 57, whereby the cylinder 40 is vented; and the surface 55 closes the port 61 to shut off the compressed air. When the valve 45 is actuated, with the valve member 54 moved towards the left, the ports 61 and 62 are connected by the recess 57 to admit compressed air to the cylinder 40, and the surface 56 is positioned between the ports 62 and 64 to shut off the venting conduit 60.

The solenoid 46 comprises a casing 65 having central apertures 66 and 67 at its ends and being vented at 68, a winding 69 provided with electrical connections 70 and 71, and a shaft or armature 72 having one end extending through the apertures 49 and 66 and being connected to the valve member 54 and having its other end extending through the aperture 67 and being provided with a push button 74, for manually moving the shaft 72 into valve actuating position. The shaft 72 is also provided with a collar 75 which serves to limit the extent of movement of the shaft and the valve member 54 to orient the surfaces 55 and 56 and the recess 57 with respect to the ports 61, 62 and 64.

The control means 17 comprise a two-way valve 76 operated by a solenoid 77, a switch 78 operated by an extension 79 depending from the platform 22, a switch (not shown) under the control of a timer 80 which is actuated upon closing the switch 78 to energize the solenoids 46 and 77 through electrical connections 70 and 71 and 81 and 82.

The valve 76 and the solenoid 77 are similar in construction and arrangement to the valve 45 and the solenoid 46, respectively, and hence need not be illustrated and described in detail. However, manual operation of the valve 76 is not required and a push button similar to button 74 of valve 45 is not required.

The valve 76 has conduits 84, 37 and 85 connected thereto which conduits correspond to the conduits 58, 59 and 60 of the valve 45.

The apparatus in FIG. 1 is shown after a main line switch 86 for energizing the electrical apparatus has been operated and just after the extruding means have been operated and as the platform 22 is descending. When the platform is in its lowermost position the sheet 12 is removed and another sheet placed on the platform 22.

Upon pushing the button 74 to the left, as viewed in FIGS. 1 and 4, the valve 45 is actuated to admit high pressure air (about 120 p.s.i.) to the cylinder 40 to operate the motor 15 and move the platform 22 upwardly. As the platform ascends, the extension 79 operates the switch 78 upwardly, as shown in FIG. 1, to actuate the timer 80 which closes the switch (not shown) that energizes the solenoids 46 and 77. The valve 45 is now held in motor operating position and the valve 76 is actuated to admit low pressure air (about 70 p.s.i.) to the tank 25 and cause the plastic bead material to be extruded through the outlet tubes 32. The platform 22 upon reaching the stops 39 is positioned at the correct distance for the sheet 12 to contact the bead material B, as seen in FIG. 3. When the desired period of extrusion time expires, the timer 80 opens the switch (not shown) which now de-energizes the solenoids 46 and 77, whereby the valves 45 and 76 under the influence of their return springs are moved to vent the cylinder 40 and the tank 25 to cause extrusion to cease immediately and to allow the platform to descend. As the sheet 12 moves away from the outlet tube 32, the plastic bead material at the bottom ends of the tubes adhere to the sheet and break away from the plastic material within the tube 32 to form beads B on the sheet.

From the foregoing description, it will be seen that the present invention provides simple and practical apparatus for extruding plastic material to ornament sheets to be decorated. The apparatus is rapid in operation and can withstand constant usage with a minimum of maintenance and repair.

As various changes may be made in the form, construction, and arrangement of the parts herein, without departing from the spirit and scope of the invention and without sacrificing any of its advantages, it is to be understood that all matters are to be interpreted as illustrative and not in any limiting sense.

What is claimed is:

1. Apparatus for applying beads of plastic material onto sheet material comprising a support for the sheet material, a closed container for an extrudable plastic material having a bottom wall, a plurality of spaced, elongated tubular outlet means depending from said bottom wall through which the plastic material is adapted to be extruded, means for relatively moving said container and said support to place said tubular outlet means adjacent to but spaced from the sheet material on said support, and means for selectively pressurizing said container to cause said plastic material to be extruded therefrom by way of said outlet means onto said sheet material.

2. Apparatus for applying beads of plastic material onto sheet material adapted to become adhered to the sheet material, said apparatus comprising a closed tank for an extrudable plastic material having an inlet in the upper portion thereof and having a bottom wall; a plurality of spaced, elongated tubular outlet means, depending from said bottom wall, a support for the sheet material; means for moving said support upwardly to place the sheet material closely adjacent to but spaced from said tubular outlet means; a conduit connected to said tank inlet at one end; a valve having an outlet connected to the other end of said conduit, an inlet connected to a source of pressurizing fluid, a vent and valving for selectively establishing flow communication between said valve inlet and outlet and between said valve outlet and said vent; means for normally positioning said valving with said valve outlet in communication with said vent; means for moving said valving to establish communication between said valve inlet and outlet to effect pressurization of said tank and cause plastic material to be extruded therefrom; and switch means under the control of said support for effecting energization of said last mentioned means.

3. Apparatus according to claim 2, wherein said switch means include a timer rendered effective upon upward movement of said support to energize said valving moving means and rendered operative after a period of time to deenergize said valving moving means.

4. Apparatus according to claim 3, including means for manually operating said support moving means in an upward direction.

5. Apparatus according to claim 3, wherein said support moving means is a fluid motor having an inlet for fluid under pressure, and said apparatus includes a valve having an outlet connected to said motor inlet, an inlet connected to a source of fluid under pressure, a vent and valving for selectively establishing flow communication between said last mentioned valve inlet and outlet and said last mentioned valve outlet and vent; means for normally positioning said valving of said last mentioned valve with its outlet in communication with its vent; means for manually positioning said valving of said last mentioned valve in an operating position to establish communication between its inlet and its outlet; and means under control of said switch means adapted to be energized to retain said valving of said last mentioned valve in its operating position and adapted to be de-energized to cause said last mentioned valving to return to its normal position, whereby said motor means is rendered ineffective and said support moves downwardly.

References Cited in the file of this patent

UNITED STATES PATENTS

| | | |
|---|---|---|
| 1,184,798 | Ward | May 30, 1916 |
| 1,809,581 | Chvojka | June 9, 1931 |
| 2,591,941 | Innerfield | Apr. 8, 1952 |
| 2,608,949 | Pasotti | Sept. 2, 1952 |
| 2,766,482 | Heibel | Oct. 16, 1956 |
| 2,806,443 | Horn et al. | Sept. 17, 1957 |
| 2,851,986 | Herschelman | Sept. 16, 1958 |